United States Patent
Zhu et al.

(10) Patent No.: US 7,597,824 B2
(45) Date of Patent: Oct. 6, 2009

(54) NEGATIVE ELECTRODES OF ALKALINE BATTERIES AND THEIR METHODS OF FABRICATION

(75) Inventors: Zhijian Zhu, Shenzhen (CN); Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 749 days.

(21) Appl. No.: 11/118,292

(22) Filed: Apr. 29, 2005

(65) Prior Publication Data

US 2005/0244714 A1 Nov. 3, 2005

(30) Foreign Application Priority Data

Apr. 30, 2004 (CN) .................. 2004 1 0027128

(51) Int. Cl.
*H01B 1/06* (2006.01)
(52) U.S. Cl. .............. 252/511; 252/519.5; 429/218.1; 429/232
(58) Field of Classification Search ............. 252/510, 252/511, 519.5; 429/218.1, 232; 427/96.1
See application file for complete search history.

(56) References Cited

U.S. PATENT DOCUMENTS 3,846,613 A * 11/1974 Jurchenko et al. ...... 219/145.23
4,332,871 A * 6/1982 Charkey ................ 429/217
5,460,899 A 10/1995 Charkey
5,466,543 A * 11/1995 Ikoma et al. ............ 429/59

FOREIGN PATENT DOCUMENTS

JP 54153242 A * 12/1979
JP 55039133 A * 3/1980

OTHER PUBLICATIONS

Duffield A, Mitchell PJ, Kumar N, et al., Rotating-Disk Study on Teflon-Bonded Porous Zinc Electrodes, J. Power Sources, 1985, 15:93.

* cited by examiner

*Primary Examiner*—Mark Kopec
(74) *Attorney, Agent, or Firm*—Venture Pacific Law, PC

(57) ABSTRACT

The present invention discloses negative electrodes for alkaline storage batteries and their methods of fabrication. The material for said negative electrode comprises of an additive that has at least one calcium compound selected from the following: tricalcium silicate, dicalcium silicate, and tricalcium aluminate. The concentration of said additive is between 1 wt % and 15 wt % of the material of said negative electrode. To fabricate said negative electrode, said additive is mixed with an active material for the negative electrode to form a paste, which is then dried. This method of fabrication is simple, convenient and low in cost. An alkaline battery using said material for its negative electrode has long cycle life and a large capacity.

18 Claims, No Drawings

NEGATIVE ELECTRODES OF ALKALINE BATTERIES AND THEIR METHODS OF FABRICATION

CROSS REFERENCE

This application claims priority from a Chinese patent application entitled: "Alkaline Storage Batteries and Their Methods of Fabrication" filed on Apr. 30, 2004 having a Chinese Application No: CN200410027128.3. This application is incorporated herein by reference.

FIELD OF INVENTION

This invention relates to negative electrodes for alkaline batteries and their methods of fabrication.

BACKGROUND

Storage batteries having zinc (Zn) as negative electrodes include the zinc nickel battery, zinc silver battery, zinc air battery and zinc manganese dioxide battery. All these batteries share a common disadvantage of having a short cycle life. The product from Zn during discharge has a relatively high solubility in the alkaline electrolyte of these batteries. Therefore, during the charge and discharge process, Zn repeatedly dissolves in the electrolyte solution and precipitates out of the electrolyte onto the electrode. However, the precipitation does not occur at the same location on the electrode where the Zn had previously dissolved. Since the current density is not distributed uniformly on the electrode, the quantity of dissolved Zn at the edge of the electrode is greater than that of precipitation. At the center of the electrodes, this phenomenon is reversed. This results in the redistribution of zinc such that the active material congregates at the center of an electrode and causes the deformation or change in the shape of the zinc electrode. During the cycling process, this deformation or shape change gradually decreases the actual surface area and, therefore, reduces a battery's capacity and shortens its cycle life.

In order to limit the deformation or shape change of the zinc electrode, research has been conducted to limit the migration of zinc during the charge and discharge process or to decrease the solubility of the zinc product in the electrolyte during discharge. Other researches have tried to change the non-uniformity of current density distribution on the electrode.

Adding a polymer-binding agent to the zinc negative electrode is one way to decrease the migration of the product during discharge. Polytetrafluoroethylene (PTFE) is commonly used. PTFE changes a component of zinc negative electrodes and limits the migration of zinc product during discharge. Duffield A, Mitchell P J, Kumar N, et al., Rotating-disk Study on Teflon-Bonded Porous Zinc Electrodes, J Power Sources, 1985, 15: 93. In these zinc electrodes, PTFE forms a three-dimensional net structure that can be seen under a microscope when the materials other than the PTFE are removed. This type of three-dimensional net structure made by PTFE is widely used in air electrodes. When air electrodes are fabricated using the method of fabrication for zinc electrodes, most materials filling in electrode slices are not active materials but materials such as sodium sulfate that can be removed by dissolving it in water. After sodium sulfate is removed by dissolving it in water, its occupied space is empty such that the remaining three-dimensional net structure can be observed easily. The purpose of forming this three-dimensional net structure in a zinc electrode is not to form empty spaces, but to use the three-dimensional net structure to pack the active material, blocking the discharge product of zinc electrodes and making migration difficult. Due to the difficulty in migration, the soluble zinc product that is continuously produced during every discharge at the discharge location also precipitates nearby after super-saturation.

However, PTFE is a type of organic macromolecule material and cannot provide the crystal nucleus for the precipitation of zinc product during discharge. The soluble zinc product during discharge only precipitates on the surface of un-discharged zinc in the forms of ZnO or $Zn(OH)_2$ after super-saturation. They do not precipitate on the PTFE. Therefore, even though the migration is limited by this organic macromolecule material, a portion of the zinc product during discharge still diffuses away due to the force created by the concentration gradient of the soluble zinc. Thus, PTFE cannot fully stop the shape change or deformation of the electrode.

A method to decrease the solubility of the zinc product during discharge is to add an additive, such as calcium hydroxide ($Ca(OH)_2$), to the electrode so that the Zn product during discharge would be insoluble. As explained in U.S. Pat. No. 5,460,899, the fundamental principle behind this process is that $Ca(OH)_2$ can react with the zinc product that is dissolved in the electrolyte solution during the discharge process in order to form calcium zincate $[Ca(OH)_2 \cdot 2Zn(OH)_2 \cdot 2H_2O]$ that is insoluble and causes the zinc product to precipitate during discharge. However, during the fabrication of the negative electrode, when the electrode paste containing the $Ca(OH)_2$ is stirred during mixing, part of the $Ca(OH)_2$ will react with the carbon dioxide in the air to form calcium carbonate causing it to lose its effectiveness. In order to avoid the reaction with carbon dioxide, the electrode paste will have to be stirred in a hermetically sealed environment. This will increase the equipment cost necessary for the production of the battery.

Another method to decrease the solubility of zinc product during discharge is to add some auxiliary salts such as $K_2CO_3$ or KF in an electrolyte containing KOH. As explained in U.S. Pat. No. 5,302,475, the fundamental principle behind this method is that the solubility of zinc product during discharge significantly decreases in an electrolyte containing KOH and a combination of KF and $K_2CO_3$ salts. However, in this three-electrolyte solution of KOH—KF—$K_2CO_3$ electrolyte, the solubility of KOH also significantly decreases. This results in the decrease of solution's alkalinity. Therefore, even though this electrolyte decreases the solubility of zinc product during discharge and inhibits the shape change or deformation of the zinc negative electrode, it also degrades the properties of the positive electrode of the battery such that it does not significantly extend the life of the battery.

Due to the limitations of the prior art, it is therefore desirable to have negative electrodes and novel methods of fabricating these negative electrodes such that the zinc electrodes do not lose their surface area during the cycling process and batteries with these electrodes have a higher capacity.

SUMMARY OF INVENTION

An object of this invention is to provide negative electrodes for alkaline batteries that are low in cost.

Another object of this invention is to provide negative electrodes which, when used in alkaline batteries, produce batteries that have a long cycle life and a large capacity.

Another object of this invention is to provide methods of fabrication for negative electrodes for alkaline batteries that are simple, convenient, and, low in cost.

Another object of this invention is to provide methods of fabrication for negative electrodes which, when used in alkaline batteries, produces batteries that have a long cycle life and a large capacity.

Briefly, the present invention discloses negative electrodes for alkaline storage batteries and their methods of fabrication. The material for said negative electrode comprises of an additive that has at least one calcium compound selected from the following: tricalcium silicate, dicalcium silicate, and, tricalcium aluminate. The concentration of said additive is between 1 wt % and 15 wt % of the material of said negative electrode. To fabricate said negative electrode, said additive is mixed with an active material for the negative electrode to form a paste and then dried. This method of fabrication is simple, convenient and low in cost. An alkaline battery using said material for its negative electrode has a long cycle life and large capacity.

An advantage of this invention is that the negative electrodes of the present invention for alkaline batteries are low in cost.

Another advantage of this invention is that the negative electrodes of present invention which, when used in alkaline batteries, produces batteries that have a long cycle life and a large capacity.

Another advantage of this invention is that the methods of fabrication for negative electrodes of alkaline batteries of the present invention are simple, convenient, and, low in cost.

Another advantage of this invention is that the methods of fabrication for negative electrodes of the present invention which, when used in alkaline batteries, produces batteries that have a long cycle life and a large capacity.

DETAILED DESCRIPTION OF THE PREFERRED EMBODIMENTS

A typical alkaline battery includes a positive electrode, negative electrode, separator and electrolyte. The negative electrode includes a material for the negative electrode coated onto the current collector. In the preferred embodiments of the present invention, the material for a negative electrode comprises of an additive wherein said additive includes at least one of the following: tricalcium silicate, dicalcium silicate, and tricalcium aluminate. The concentration of said additive is at between 1 wt % and 15 wt % of said material. In the preferred embodiments, the concentration of said additive is between 3.5 wt % and 10 wt % of said material for a negative electrode.

The additives, dicalcium silicate, tricalcium silicate, or tricalcium aluminate can react with water and form hydrates, namely calcium silicate hydrate and calcium aluminate hydrate.

The reaction of tricalcium silicate react with water is described by the following equation:

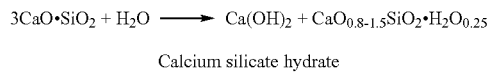

Calcium silicate hydrate

Dicalcium silicate and water have a similar reaction as tricalcium silicate.

The reaction of tricalcium aluminate and water is described by the following equations:

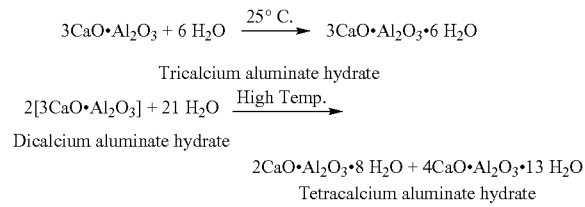

In the past, it was believed that calcium silicate hydrate and calcium aluminate hydrate were amorphous colloids. Actually they are fiber crystals that are very small. The size of these crystals is in the size range of colloids. They also have high specific surface area. The early stage of above described reactions generates a large number of colloid sized crystals such as $CaO_{0.8-1.5}SiO_2.H_2O_{0.25}$ and larger crystals such as $Ca(OH)_2$ coating the surface of tricalcium silicate, dicalcium silicate and tricalcium aluminate particles that have not reacted with water. These tiny crystals are bound together by extremely weak physical attractive forces at their contact points to form a spatial three-dimensional net structure in the paste. Since this structure is formed by the binding of weak attractive forces at random contact points, the strength of the structure is very low and it has apparent plasticity that does not affect the stirring and dipping of paste for electrodes. The above-described reaction continues as the temperature increases during the drying process. The unstable coating layer on the particles surface is destroyed resulting in the acceleration of the reaction. New and more stable hydrate crystals are continuously separated out and grow. These crystals are joined together by multiple physical attractive forces forming a strong dense structure.

When the above reaction stops, a strong three-dimensional net structure that is connected and bonded by multiple physical attractive forces would have been formed. This structure fixes the position of the active materials in the zinc negative electrode that have not reacted in the structure. During battery use, the calcium silicate hydrate, calcium aluminate hydrate and calcium hydroxide at the surface of the tri-dimensional net structure can react with zinc product during discharge to form insoluble calcium zincate and zinc silicate.

In the embodiments, the concentration of the additive is at between 1 wt % and 15 wt % of said material. The optimal concentration is at between 3.5 wt % and 10 wt %. If the concentration of the additive is too high, the capacity of battery will decline. If the concentration of the additive is too low, the desired effect from the addition of the additive will not be obtained.

In preferred embodiments, said material can also include one or more of the following: zinc oxide, mercury-free zinc powder, binding agent, and a metal oxide. There are no specific limitations for said metal oxide. It can be at least one of the customary metal oxides used in current technology such as: PbO, CdO, or $Bi_2O_3$. There is no specific requirement for said binding agent. It can be at least one of the customary binding agents used in the current technology such as: polyvinyl alcohol (PVA), hydroxylpropyl methyl cellulose (HPMC) or sodium carboxy methyl cellulose (CMC).

In addition, said material can have a retarder to delay the coagulation of the material. The optimal selection for said retarder is calcium sulfate dihydrate where the molar ratio of said retarder such as calcium sulfate dihydate to said additive is (0~3):1. The preferred molar ration of said retarder such as calcium sulfate dihydate to said additive (0.5~2):1.

Said additives in the embodiments can all have the above-described reaction with water. If the reaction is too fast, it will cause the material for the negative electrode to coagulate too fast during mixing process such that the material cannot coat the current collector uniformly. Therefore, in preferred embodiments, a retarder is added to said material. Calcium sulfate dihydrate is the preferred retarder. Adding a retarder will delay the coagulation of the material. Adjusting the quantity of retarder can control the coagulation time during the mixing process. The preferred molar ratio of calcium sulfate dihydate to additive is between (0~3):1. The optimal range is (0.5~2):1.

Furthermore, said material can also include a carbon black where a conductive carbon black is preferred. Adding carbon black to said material for negative electrode can improve high rate discharge properties of the battery.

In the embodiments, said negative electrode current collector is a mesh copper belt coated with lead, tin or lead-tin alloy.

In fabricating the alkaline battery using said negative electrode of the embodiments, there is no special limitation on the material to be used for the positive electrode. It can be at least one of the customary materials for positive electrodes used in current technology such as: silver oxide ($Ag_2O$), manganese dioxide ($MnO_2$) and nickel hydroxide ($Ni(OH)_2$). There is also no special limitation on the separator for the battery. It can be at least one of the customary materials for the separator used in current technology such as: composite separator made by binding a wettable polyolefin micro-pore membrane and modified polypropylene felt, or made by binding a wettable polyolefin micro-pore membrane and vinylon felt, or made by welding a wettable polyolefin micro-pore membrane and a nylon felt. There is also is no special limitation on said electrolyte. It can be a customary electrolyte used in current technology such as sodium hydroxide, or potassium hydroxide.

The steps to fabricate the alkaline storage battery using the negative electrodes of the present invention include the steps of: stacking and separating the negative electrode, separator and the positive electrode to form an electrode core; placing the core in the battery container, injecting the electrolyte, and sealing the container.

In the preferred embodiments, the methods of fabrication for said negative electrode comprises the steps of:

mixing the ingredients to form said material of the negative electrode to form a paste. In the preferred embodiments, said material includes an additive where said additive is at least one of the following: tricalcium silicate, dicalcium silicate, or tricalcium aluminate. The concentration of said additive is at between 1 wt % and 10 wt % of said material. That is the weight of said additive is between 1 wt % and 10 wt % of the weight of material after all fabrication steps are completed. The optimal concentration of said additive is between 3.5 wt % and 10 wt % of said material.

coating the mixed paste onto the current collector for the negative electrode;

drying paste on the current collector (in the preferred embodiments, the drying is conducted using heat);

rolling and trimming said dried paste; and welding a conduction tab to the current collector.

In the preferred embodiments, for ease of coating, the concentration of the solids in said paste should be between 50 wt % and 70 wt % of said paste.

In the preferred embodiments, said ingredients of said material also comprise of an active material that can include zinc oxide, a metal oxide, or a mercury free zinc powder, and a binding agent. There is no specific specification for said metal oxide. It can be at least one of the customary metal oxide used in current technology such as: PbO, CdO, or $Bi_2O_3$.

It is also preferable to add a retarder as another ingredient to said paste to delay the coagulation of the material. Calcium sulfate dihydrate is the preferred choice for the retarder. In the embodiments, the molar ratio of said retarder such as calcium sulfate dihydrate to said additive is (0~3):1. Optimally, the molar ratio of said retarder to said additive is (0.5~2):1.

In embodiments, the ingredients to form said material also include a solvent. The solvent of said paste can be at least one of the following solution: deionized water, alcohol, mixture of deionized water and alcohol.

In the drying step, the paste can be dried with heat in an oven or stand dryer. The preferred drying temperature is between 80° C. and 130° C. The optimal temperature range is between 100° C. and 115° C.

Furthermore, said ingredients to form said material for negative electrode can also include a carbon black where it is preferred for the carbon black to be conductive.

In the embodiments, negative electrode current collector can be a mesh copper belt coated with lead, tin or lead-tin alloy.

The following specific embodiments for the negative electrodes are used in cylindrical shape zinc nickel battery to further describe this invention. The batteries using the embodiments are tested to compare the characteristics of said embodiments.

Embodiment 1

The steps for the fabrication of the negative electrode of this embodiment include:

mixing uniformly 0.5 g of tricalcium silicate, 0.25 g of dicalcium silicate, 0.08 g of tricalcium aluminate, 0.03 g of calcium sulfate dihydrate, 16 g of mercury-free zinc powder, 60 g of zinc oxide, 3 g of conductive carbon black and 3 g of cadmium oxide;

stirring the above mixture with 20 g of 3% concentration polyvinyl alcohol (PVA), 25 g of 2% hydroxylpropyl methyl cellulose (HPMC), and 5 g of deionized water to form a paste;

coating said paste on a mesh copper belt coated with Pb—Sn alloy with a thickness of 0.07 mm and width of 42 mm;

drying with heat in a stand dryer; and rolling, trimming, and welding conduction tabs to obtain a couple of negative electrodes with length 95 mm.

The steps for the fabrication of the positive electrode include:

stirring 92 g of spherical nickel hydroxide, 7 g of cobaltous oxide, 11 g of conductive carbon black, 3 g of polytetrafluoroethylene (PTFE), 0.3 g of sodium carboxy methyl cellulose (CMC) and 52 g of deionized water to form a paste;

coating the paste onto nickel foam that is welded with conduction tabs;

drying with heat by horizontal type dryer at temperature 105° C.; and rolling and trimming to obtain positive electrodes with length 65 mm and width 40 mm.

The fabrication of the separators includes the welding of a vinylon belt with length 210 mm, width 44 mm, thickness 0.15 mm and wettable polyolefin micro-pore membrane by using high frequency welding machine to obtain a piece of composite separation material.

The assembly of alkaline battery includes the following steps:

winding the positive electrode and negative electrode, which are separated by the separator by using a winding machine to form the electrode core;

placing said electrode core in a AA type battery steel can;

welding the positive electrode tab to the inside bottom of the can;

welding the negative electrode tab to a header with a gasket which are used to seal the battery;

injecting battery with electrolyte containing 30% of KOH and 1.5% of LiOH;

placing the header on the can opening, and crimping the header to the can to seal the battery to obtain said AA type cylindrical zinc nickel battery.

Embodiment 2 to Embodiment 12

The method of fabrication for the negative electrodes of these embodiments is the same as Embodiment 1. The material is the same as Embodiments 1, except that the quantities of additive and retarder are different. These quantities are shown in Table 1.

The fabrication of the separator and positive electrode, and the assembly of the batteries in these embodiments are the same as Embodiment 1.

TABLE 1

| Embodiment | Tricalcium Silicate (g) | Dicalcium Silicate (g) | Tricalcium Aluminate (g) | Calcium Sulfate Dihydrate (g) |
|---|---|---|---|---|
| Embodiment 2 | 1.3 | 0.6 | 0.2 | 0.07 |
| Embodiment 3 | 1.8 | 0.9 | 0.3 | 0.1 |
| Embodiment 4 | 3.6 | 1.8 | 0.6 | 0.2 |
| Embodiment 5 | 5.2 | 2.6 | 1.0 | 0.5 |
| Embodiment 6 | 6.6 | 3.3 | 1.2 | 0.8 |
| Embodiment 7 | 7.7 | 3.9 | 1.5 | 1.5 |
| Embodiment 8 | 5 | 0 | 0.9 | 0.4 |
| Embodiment 9 | 0 | 5 | 0.9 | 0.4 |
| Embodiment 10 | 4 | 2 | 0 | 0 |
| Embodiment 11 | 2 | 4 | 0 | 0 |
| Embodiment 12 | 0 | 0 | 4 | 6.4 |

Comparison Example 1

The fabrication of the negative electrode in this comparison example is the same as in Embodiment 1, except that none of followings chemicals are added: tricalcium silicate, dicalcium silicate, tricalcium aluminate and retarder calcium sulfate dehydrate.

The fabrication of the separator and positive electrode, and the assembly of the batteries in this comparison example are the same as Embodiment 1.

Comparison Example 2

The fabrication of negative electrode in this comparison example is the same as Embodiment 1, except that 2 g of PTFE with a concentration of 60 wt % is used to replace the additives tricalcium silicate, dicalcium silicate, tricalcium aluminate and retarder calcium sulfate dihydrate.

The fabrication of the separator and positive electrode, and the assembly of the batteries in this comparison example are the same as Embodiment 1.

Comparison Example 3

The fabrication of negative electrode in this comparison example is the same as Embodiment 1, except that 6 g of $Ca(OH)_2$ is used to replace the additives tricalcium silicate, dicalcium silicate, tricalcium aluminate and retarder calcium sulfate dihydrate.

The fabrication of the separator and positive electrode, and the assembly of the batteries in this comparison example are the same as Embodiment 1.

Testing of the Properties of the Batteries

To test the cycling properties, batteries from the embodiments and comparison examples are charged with 210 mA for 4 hours and then discharged with 210 mA to 1.2V. The test is terminated when the discharging capacity of batteries is 70% of the initial discharging capacity. The results of the testing are shown in Table 2.

TABLE 2

| Embodiment | Capacity(mAh) | Cycling life (times) |
|---|---|---|
| Embodiment 1 | 760 | 380 |
| Embodiment 2 | 750 | 420 |
| Embodiment 3 | 750 | 490 |
| Embodiment 4 | 750 | 550 |
| Embodiment 5 | 740 | 520 |
| Embodiment 6 | 720 | 520 |
| Embodiment 7 | 690 | 500 |
| Embodiment 8 | 740 | 510 |
| Embodiment 9 | 730 | 490 |
| Embodiment 10 | 740 | 500 |
| Embodiment 11 | 740 | 480 |
| Embodiment 12 | 730 | 460 |
| Comparison Example 1 | 770 | 180 |
| Comparison Example 2 | 750 | 350 |
| Comparison Example 3 | 750 | 390 |

Table 2 shows that the batteries obtained by using the embodiments of the negative electrodes of the present invention and the embodiments of the fabrication method for negative electrodes for alkaline storage batteries of the present invention have longer cycling life and higher capacity. These embodiments of the fabrication method for negative electrodes are easy, simple and have low cost. It should be noted that the embodiments of this invention are not limited to negative electrodes for cylindrical zinc nickel batteries and their fabrication methods. These embodiments can also be used in other types of alkaline storage batteries.

While the present invention has been described with reference to certain preferred embodiments, it is to be understood that the present invention is not limited to such specific embodiments. Rather, it is the inventors' contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A negative electrode material having a retarder and an additive wherein said additive is at least one calcium compound selected from the group consisting of: tricalcium silicate, dicalcium silicate, and tricalcium aluminate.

2. The negative electrode material of claim 1 wherein the concentration of said additive is from 1 wt % to 15 wt % of said material.

3. The negative electrode of claim 2 wherein said material further includes a zinc oxide and a metal oxide.

4. The negative electrode material of claim 1 wherein the concentration of said additive is from 3.5 wt % to 10 wt % of said material.

5. The negative electrode material of claim 1 wherein said material further includes a zinc oxide and a metal oxide.

6. The negative electrode material of claim 5 wherein said metal oxide is at least one metal oxide selected from the group consisting of: PbO, CdO and $Bi_2O_3$.

7. The negative electrode material of claim 1 wherein said retarder is calcium sulfate dihydrate.

8. The negative electrode material of claim 1 wherein the molar ratio of said retarder to said additive is (greater than 0 to 3:1.

9. The negative electrode material of claim 1 wherein the molar ratio of said retarder to said additive is (0.5~2):1.

10. The material for a negative electrode of claim 1 wherein said material also comprises of carbon black.

11. A negative electrode material for an alkaline battery, comprising:
    an additive;
    zinc oxide;
    a metal oxide;
    a retarder;
    carbon black; and wherein
    said additive is at least one calcium compound selected from the group consisting of: tricalcium silicate, dicalcium silicate, and tricalcium aluminate;
    the concentration of said additive is between 1 wt % and 15 wt % of said material;
    said metal oxide is at least a metal oxide selected from the group consisting of: PbO, CdO and $Bi_2O_3$;
    said retarder is calcium sulfate dihydrate; and
    the molar ratio of said retarder to said additive is (greater than 0 to 3:1.

12. A method for fabricating a negative electrode material, comprising the steps of:
    mixing ingredients to form said material in a paste form, wherein said ingredients to form said material include an active material, an additive, and a retarder;
    coating said paste onto a current collector; and
    drying said paste; and
    wherein said additive is at least one calcium compound selected from the group consisting of: tricalcium silicate, dicalcium silicate, and tricalcium aluminate.

13. The method of claim 12 wherein the concentration of said additive is from 1 wt % to 15 wt % of said material.

14. The method of claim 12 wherein said active material includes a zinc oxide and a metal oxide.

15. The method of claim 12 wherein the concentration of the solid content of said paste is from 50 wt % to 70 wt % of said paste.

16. The method of claim 12 wherein said retarder is calcium sulfate dihydrate.

17. The method of claim 12 wherein the molar ratio of said retarder to said additive is (greater than 0 to 3:1.

18. The method of claim 12, wherein
    the concentration of said additive is 1 wt % to 15 wt % of said material;
    said active material includes a zinc oxide and a metal oxide;
    said metal oxide is at least a metal oxide selected from the group consisting of: PbO, CdO and $Bi_2O_3$;
    said ingredients to form said material also include calcium sulfate dihydrate;
    the molar ratio of said calcium sulfate dihydrate to said additive is (greater than 0 to 3:1;
    said ingredients to form said material further include carbon black; and
    the concentration of the solid content of said paste is 50 wt % to 70 wt % of said paste.

* * * * *